June 16, 1959    W. WALLIN    2,890,622
ANAMORPHOSING SYSTEM
Filed Aug. 11, 1954    2 Sheets-Sheet 1
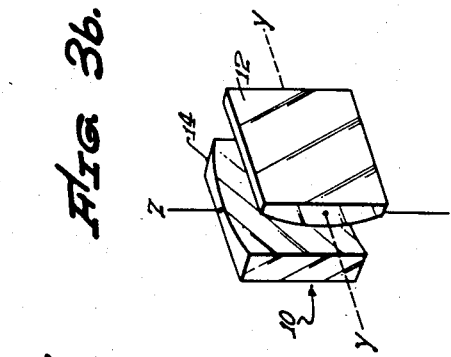
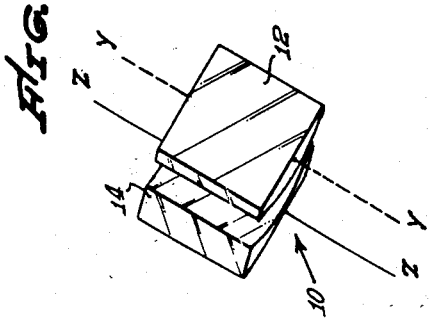
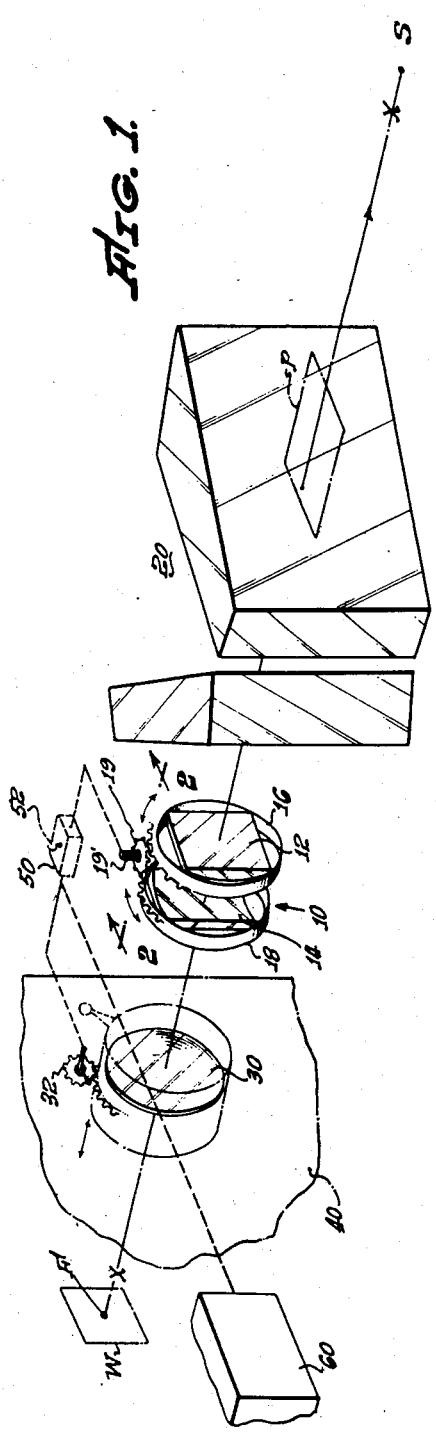
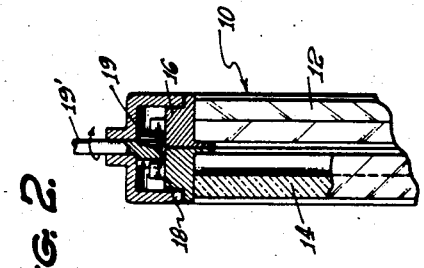
WALTER WALLIN,
INVENTOR.
BY Reed C. Lawlor
ATTORNEY.

June 16, 1959  W. WALLIN  2,890,622
ANAMORPHOSING SYSTEM
Filed Aug. 11, 1954  2 Sheets-Sheet 2

WALTER WALLIN,
INVENTOR.

BY 
ATTORNEY.

though the diameter of the bundle of rays is altered

United States Patent Office 2,890,622
Patented June 16, 1959

2,890,622

ANAMORPHOSING SYSTEM

Walter Wallin, Canoga Park, Calif., assignor to Panavision, Inc., a corporation of California Application August 11, 1954, Serial No. 449,233

4 Claims. (Cl. 88—57)

My invention relates to anamorphosing systems, and especially to such systems that are used in the art of taking and projecting motion pictures.

Various types of anamorphosing systems have been developed, some employing cylindrical lens anamorphosers and some employing prism anamorphosers. In all cases, the anamorphoser is arranged on the optical axis of a spherical focusing lens, whether it be in a camera or in a projector. Anamorphosers employing cylindrical lenses are disclosed, for example, in Chretien Patent No. 1,829,633, Ford Patent No. 1,943,172 and Newcomer Patent No. 1,945,950. Anamorphosers of the prism type are disclosed for example in Newcomer Patents No. 1,898,787 and No. 1,931,992.

In all such anamorphosing systems, a film plane and another plane are arranged at conjugate foci, the former behind the lens and the latter in front of the lens. The film, or back plane, whether it be in a camera or in a projector, is usually relatively close to the focusing lens. In a projector, the front plane is located at the screen upon which images of films are projected, and in a camera the front plane is arranged in the middle of the scene which is to be photographed. In both cases the front plane is at a long front conjugate distance in front of the focusing lens and the film plane is located at a short back conjugate distance behind the focusing lens.

In anamorphosing systems that are now in common use in the art of motion picture photography, the anamorphoser compresses the picture horizontally during photographing and expands the image horizontally during projection. In the anamorphosing systems of the type in common use, the anamorphoser itself produces unity magnification in a vertical direction, but produces a magnification M in a horizontal direction. For this reason, the horizontal plane is called the active plane. Generally speaking, the anamorphotic ratio is the ratio of magnification in the active plane to the magnification in a plane normal thereto. Where such unity in vertical magnification exists, the anamorphotic ratio M is the ratio of horizontal angles between rays on the front or expansion side of the anamorphoser to the horizontal angles between the same rays on the rear or compression side. In one system that is in common use, the anamorphotic ratio M is 2 and in another it is 1.4. In these systems, the horizontal magnification during projection is twice that of the vertical magnification or 1.4 times that of the vertical magnification, as the case may be. And in the photographing process, an inverse relationship occurs.

Very commonly, the anamorphoser itself is afocal. In such a unit, parallel rays entering one side of the anamorphoser emerge as parallel rays from the other side, even in passing through the anamorphoser. For this reason, when such an anamorphoser is placed in front of the focusing lens, that is on the opposite side of the focusing lens from a back conjugate plane, the position of the front conjugate plane, whether it be at the screen or in the scene, remains at infinity if already located at infinity. Furthermore, in such a case, the placing of an anamorphoser in such a position does not introduce any astigmatism.

However, it is frequently necessary to focus either a camera or a projector in order to photograph closeups or to project pictures onto a close screen. When the focusing lens is adjusted for this purpose, it is found that astigmatism is introduced and that the amount of astigmatism that occurs depends on the distance to the screen or to the scene, as the case may be. When photographing very near closeups, or for projecting images onto a very near screen, the astigmatism is very serious.

In the past, astigmatism produced by an anamorphosing system, including both a spherical focusing lens and an anamorphoser, has been prevented by employing collimating lenses in front of the anamorphoser. In particular, Newcomer Patent No. 2,048,284, discloses an arrangement in which a spherical correcting lens of variable focus is arranged in front of an anamorphoser to collimate the object or projection screen with respect to the anamorphoser. With such a correcting lens applied to a camera, the rays diverging from an object are converted into a collimated beam prior to passage through the anamorphoser so that the anamorphoser and the focusing lens that is adjacent the camera do not introduce any astigmatism. Conversely, when such a correcting lens is employed in a projector, the film is mounted at the focal plane of the projector lens and the collimated beam emerging from the anamorphoser is focused by the correcting lens onto the projecting screen.

In such prior system, the variable focus collimating lens that is located in front of the anamorphoser comprises at least two elements, a positive spherical lens and a negative spherical lens, and the distance between these two lenses is adjusted to vary the focus of the over-all anamorphosing system comprising this variable focus correcting lens, the anamorphoser, and the stationary focusing lens that is closest to the film. My invention possesses a number of advantages over such prior system. For one thing, the anastigmatic anamorphosing system of my invention is more compact than that of Newcomer. In addition, it employs correcting lenses of lower power and therefore subject to less chromatic aberration. And, furthermore, the anamorphosing system of my invention possesses a greater depth of focus.

According to my invention, a variable astigmatizer is arranged in the optical path in order to adjustably compensate for the variable amount of astigmatism that is introduced in an anamorphosing system when it is focused on screens or scenes at different distances. In the specific embodiment of the invention described in detail hereinafter, the variable astigmatizer is in the form of a pair of complementary cylindrical lenses which are mounted so that their axes may be rotated by equal amounts in opposite directions about the optical axis to provide the variable astigmatic correction needed. More particularly, when the long conjugate distance is, in effect, infinite, the axes of the two cylindrical lenses are at an angle of 45° relative to the active plane of the anamorphoser and when the long conjugate distance is changed, the bisector between the axes of the cylindrical lenses remains stationary as the two lenses are rotated to provide the desired correction. Furthermore, in accordance with this invention, the movement of the cylindrical lenses is coordinated automatically with the adjustment of the focusing system so that the astigmatism correction occurs automatically during focusing.

While the invention is applicable to anamorphosing systems employing other types of anamorphosers, it is described hereinafter particularly with reference to its application to systems employing prism anamorphosers. It is, therefore, to be understood that the invention is not limited to the specific embodiment thereof that is illustrated in the accompanying drawing and described hereinafter, but includes all forms thereof that fall within the scope of the appended claims.

In the accompanying drawings:

Figure 1 is a schematic optical diagram, in perspective, of an anamosphosing system employing my invention;

Fig. 2 is a fragmentary sectional view of the astigmatizer taken on the line 2—2 of Fig. 1;

Figs. 3a and 3b are perspective views of the cylindrical lenses of the variable astigmatizer when arranged to produce minimum and maximum astigmatism correction respectively;

Figure 5V:
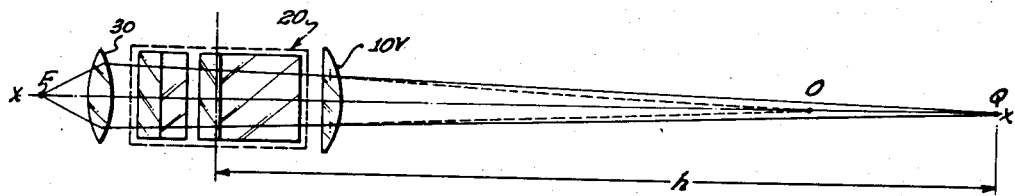
Figs. 5V and 5H are schematic diagrams of the anamorphosing system employed to explain the effects in both vertical and horizontal planes respectively.

Referring to the drawings and particularly to Fig. 1, there is illustrated a system in which a variable astigmatizer 10 is employed between a prism anamorphoser 20 and the focusing lens 30 of a photographic device in the form of a camera or projector 40. To simplify the explanation, the invention is described hereinafter in detail with reference to its application to a camera though, as will be understood by those skilled in the art, it is equally applicable to a projector.

The focusing lens 30, the variable astigmatizer 10, and the prism anamorphoser 20 are arranged in the order named along an optical axis X—X between a window W at the film plane F and a scene or object space S. The camera is of the type generally employed in the taking of motion pictures in which successive frames of a strip of motion picture film are intermittently positioned in the window W and such frames are successively exposed automatically by the operation of a shutter. The focusing of the lens 30 is accomplished by moving it axially along the optical axis X—X by the rotation of a focusing gear 32.

The prism anamorphoser 20 may be of any conventional type such as that disclosed in Newcomer Patent No. 1,931,992. The prism anamorphoser disclosed in that patent is very satisfactory if the anamorphotic ratio is $M=1.4$. However, if the anamorphotic ratio is $M=2$, as is required in some systems now currently in use, more satisfactory results are obtained by employing a prism anamorphoser now in use. Such anamorphosers are of the straight-through type. They are achromatic and they are also equilateral, that is, they produce symmetrical magnification about the optical or equilateral axis even though the magnification may vary somewhat in a direction that is normal to this axis and in the active plane. Such an anamorphoser 20 is commonly arranged with its active plane horizontal, as indicated by the dashed parallelogram P in Fig. 1. In such a camera, the film travels vertically and the picture frames commonly have a width to height ratio of 4 to 3. Furthermore, in some systems, the anamorphotic ratio M may be adjusted by varying the orientations of the prism axes normal to the active plane without destroying the equilateral and achromatic characteristics. Such a variable anamorphoser is disclosed in Newcomer Patent No. 1,931,992.

The variable astigmatizer 10 comprises a pair of thin complementary cylindrical lenses, namely: a positive cylindrical lens 12 and a negative cylindrical lens 14. The axis of the positive cylindrical lens 12 is indicated in the various figures by the dashed line Y—Y, and the axis of the negative cylindrical lens 14 is indicated in the various figures by the solid line Z—Z. These axes are normal to the active planes of the cylindrical lenses. In the embodiment of the invention illustrative herein, the cylindrical lenses 12 and 14 are mounted in corresponding gear rings 16 and 18, respectively, that may be rotated in opposite directions by means of a pinion gear 19. The gears of the astigmatizer are preferably of the bevel-gear type. The ring gears are journalled for rotation within a ring-shaped holder 17 and the pinion is supported in place by means of a shaft 19' that extends radially outwardly through the holder. In order to permit compensation for astigmatism automatically during focusing, the focusing gear 32 and the pinion gear 19 are linked together and are operated simultaneously by manipulation of a knob 52 of a focus adjusting, or control, unit 50. A view finder or camera sight 60 of variable parallax relative to the optical axis X—X may also be linked to the focusing unit so that the view finder always frames the scene in the front conjugate plane upon which the camera is focused.

The variable astigmatizer 10 is so mounted that when the axes Y—Y and Z—Z of the cylindrical lenses 12 and 14 are parallel to each other, they are inclined at an angle of 45° with respect to the horizontal or active plane of the anamorphoser 20. As the cylindrical lenses 12 and 14 are counter-rotated, the bisector between their axes remains inclined at an angle of 45° relative to the horizontal or active plane. By rotating the negative cylindrical lens 14 in a direction away from the active plane of the anamorphoser and the positive lens 12 in a direction toward the active plane in an appropriate amount, astigmatism produced by the anamorphoser 20 as lens 30 is focused, is eliminated. In Fig. 3a, the lenses are shown in the position with both axes Y—Y and Z—Z at 45° corresponding to anastigmatic focus at infinity. In Fig. 3b, the lenses are shown with the axis Y—Y of the positive lens 12 horizontal and the axis Z—Z of the negative lens vertical. In the latter position, the system is anastigmatic when focused at a minimum front conjugate distance. In intermediate positions of the lenses, the system is focused without astigmatism at front conjugate distances of intermediate values.

Figure 5H:
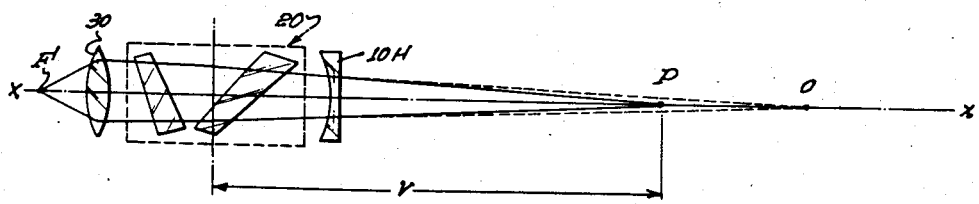
Figure 4:
Fig. 4 is a chart employed to explain the variable effect of the variable astigmatizer.

The manner in which the variable astigmatizer 10 compensates for the astigmatism produced by the anamorphosing system including the anamorphoser 20 and the focusing lens 30 may be understood by reference to Figs. 4, 5V and 5H. The two cylindrical lenses 12 and 14 are of a low power of about 0.5 diopter or less and they are thin and spaced close together. As a result, when their axes Y—Y and Z—Z are parallel, they are equivalent to a flat piece of glass. But when the cylindrical lenses 12 and 14 are rotated by equal amounts in opposite directions from the aforementioned initial 45° position, they are equivalent to two fictitious cylindrical lenses, one having a vertical axis and one having a horizontal axis. While the powers of these equivalent or fictitious lenses are equal to each other numerically at any one time, they are of opposite sign and the numerical values of their powers vary with the angle between the real cylindrical lenses 12 and 14.

In Fig. 4, there is illustrated, in a very schematic manner, the optical effect of the variable astigmatizer 10 as the orientation between the axes Y—Y and Z—Z of the cylindrical lenses 12 and 14 is varied. In the first column, the angle $\theta$ represents the angle of separation of the optical axes Y—Y and Z—Z. In the second column, the orientation of the axes corresponding to these different angles is illustrated graphically. In the third and fourth columns, there is shown graphically the effective equivalent cylindrical lenses in the vertical and horizontal planes respectively. In other words, in the third and fourth columns there are represented positive and negative lenses having horizontal and vertical axes which could be employed to replace the variable astigmatizer to produce the same effect as the variable astigmatizer for different orientation angles.

Thus, for example, when $\theta=0°$, the two axes Y—Y and Z—Z are parallel. In this case, the variable astigmatizer acts as a plane piece of glass and is equivalent to an optical flat. Here it will be noted that the cross-section of the optical flat in both the vertical and horizontal planes, is simply a rectangle. Also, when the angle of orientation $\theta=90°$ as shown in Fig. 3, the axis Y—Y of the positive lens 12 is horizontal and the axis Z—Z of the negative lens 14 is vertical. In this particular case, the equivalent pair of optical elements is identical with the real lenses of the astigmatizer, one of them having a vertical cross-section identical with the cross-section of the positive lens 12 and the other having a horizontal cross-section identical with that of the negative lens 14. And when the orientation angle $\theta$ is of some intermediate value such as $\theta=45°$, the equivalent positive lens has a vertical cross-section of less curvature than that of the positive lens 12 and similarly the equivalent negative lens has a horizontal cross-section of less curvature than that of the negative lens. In any event, it will be noted that for any orientation whatsoever of the cylindrical lenses 12 and 14, the variable astigmatizer constitutes in effect a compound variable cylindrical lens having a positive curvature in vertical cross-section and an equal but negative curvature in horizontal cross-section. By rotating the two lenses 12 and 14, the effective curvature or power of the astigmatizer 10 in the horizontal and vertical planes may be varied from a minimum value of zero to a maximum value equal to the power of each the two cylindrical lenses 12 and 14.

In order to appreciate how the variable astigmatizer 10 cooperates with the anamorphoser 20 and the focusing lens 30 to produce an anastigmatic anamorphosing system of variable focus, it is convenient to consider first the effect of the anamorphoser 20 and the lens 30 in the absence of the variable astigmatizer. In this analysis, to simplify the explanation it is assumed that the focusing lens 30 is set in position in front of the window W, so that without an anamorphoser or an astigmatizer, an object located at Q would be focused by the lens 30 both vertically and horizontally on the film plane F.

Referring to Fig. 5V showing a vertical section through the optical axis X—X, rays from a horizontal line at Q pass through the anamorphoser 20 and are focused by the lens 30 in the film plane F. The horizontal line Q is located at a front horizontal focal position that is conjugate to the film plane F. Due to the fact that the anamorphoser 20 does not produce any change in the angles of rays in a vertical plane but does introduce a glass path, the actual horizontal focal position with the anamorphoser 20 present is a little farther from the lens than the front conjugate focus of the lens 30 above.

Referring next to Fig. 5H, showing a horizontal section through the optical axis X—X, in the absence of the variable astigmatizer 10, rays that emerge from a vertical line P are also focused on the film plane F. The vertical line P is located at a point in front of the anamorphoser spaced from the horizontal focal position Q by an amount that depends upon the anamorphotic ratio M. In the specific anamorphosing system described herein, the object space S is located on the expansion side of the anamorphoser 20, while the focusing lens 30 and the image space in which the film plane F is located are on the compression side of the anamorphoser. For this reason, in this case:

$$M=\frac{h}{v}$$

where $h=$ front horizontal conjugate distance
$v=$ front vertical conjugate distance In this formula, no account has been taken of the apparent shortening of the ray paths due to the thickness of the glass of the anamorphoser when viewed from the focusing lens. But even if it is included the formula still holds, if the amount of shortening of the paths in the two planes due to the presence of the glass is subtracted from both $h$ and $v$.

Thus, the anamorphosing system comprising the anamorphoser 20 and the variable focus lens 30 exhibits astigmatism, in which a front vertical focus P exists at a relatively nearby position and a front horizontal focus Q exists at a relatively distant position. The distance between the vertical and horizontal focal positions varies with the adjustment of the focusing lens 30, increasing as the front conjugate distance of the lens increases and as the back conjugate distance of the lens decreases. From this, it is seen that the astigmatism of the system becomes increasingly serious as the front or long conjugate distance decreases and the back or short conjugate distance increases. For this reason, in the absence of the astigmatizer 10, when closeups are being photographed, it is impossible to achieve sharp focus both horizontally and vertically at the same time, and good definition is not obtained in the photograph.

To simplify the explanation, it will now be assumed that a variable astigmatizer is introduced into the optical path in front of the anamorphoser.

By employing the astigmatizer 10 an image of a real object located at the proper position O between the horizontal and vertical focal positions Q and P, can be focused sharply in the film plane F, both in a horizontal direction and in a vertical direction, thus achieving good definition in closeups. As indicated in Fig. 5V by the symbol 10V, the astigmatizer 10 has a positive power in a vertical plane, causing a real object at O to appear as a virtual horizontally focused object at Q. Likewise, the astigmatizer 10 has a negative power as indicated by the symbol 10H as in Fig. 5H, thus causing a real object at O to appear as a vertically focused virtual object at P. With this arrangement, the astigmatism introduced by the astigmatizer produces vertical and horizontal virtual objects at the horizontal and vertical conjugate foci P and Q of the focusing lens 30 and the anamorphoser 20. As a result, a real object at O is properly focused in the film plane F, both vertically and horizontally, thus making it possible to obtain clear definition in closeups.

It can be shown that, when the object is in focus on the film plane, the distance A from the astigmatizer 10 to the object position O is given by the formula:

$$A=\frac{M^2-1}{M^2+1}\cdot\frac{1}{D}$$

where $M=$ anamorphotic ratio, and
$D=$ effective power of the astigmatizer in both the vertical and horizontal plane.

It can also be shown that as the angle of orientation $\theta$ between the cylindrical lenses 12 and 14 is varied, the effective power in the horizontal and vertical planes is determined by the following equation:

$$D=D_0 \sin \theta$$

where $D_0=$ power of each of the cylindrical lenses 12 and 14.

It can also be shown that in this particular case, in which the focusing lens, the cylindrical lenses and the anamorphoser are close together, the distance A is approximately related to the normal lens distance reading $y$ by the following approximate equation:

$$A=\frac{2}{3}y$$

By employing a common adjusting unit 50 to adjust the variable astigmatizer 10 simultaneously with the focusing of the lens 30, astigmatism correction is obtained automatically as the lens is focused. By employing such a common control, it then becomes an easy matter to adjust the focus of the lens for objects at different distances without introducing astigmatism. Furthermore, by employing such a common control, it becomes a relatively easy matter to maintain good anastigmatic focus on an object that is moving toward or away from the camera, as in an approach, or dolly, shot.

The foregoing formulas apply whether or not the astigmatizer is in front of the anamorphoser or whether it is between the anamorphoser and the focusing lens. Accordingly, in order to permit making closer closeups, the astigmatizer is placed between the anamorphoser and the focusing lens, and in fact, as close as possible to the focusing lens. In any event, the cylindrical lenses 12 and 14 are always located at a distance from the focusing lens 30 which is much less than the focal length of either of the cylindrical lenses.

The cylindrical lenses 12 and 14 are both of low power such as about 0.25 diopter and they are placed close together.

In explaining the invention above in connection with its application to a motion picture photography, the effect of the variable astigmatizer has been discussed only with reference to rays of light that travel from the object space or scene S toward the anamorphosing system and then to the film plane F. It will be understood, however, that the optical system is reversible and that if a photographic film bearing a picture is placed in the film plane F and is illuminated from the rear, an image of that film can be projected onto a screen in the space S. The rays in this case travel from the film plane F through the spherical lens 30 through the variable astigmatizer 10 and then through the anamorphoser 20 onto the screen. When the picture is to be projected onto a screen, manipulation of the focusing unit causes the image to be focused on the screen without astigmatism. Both in motion picture photography and in motion picture projection, the anamorphoser and the variable astigmatizer are at the front of the focusing lens 30, and a plane, whether it be in an object space or on a projection screen, which is located at a long conjugate distance in front of the camera or projector is brought to a sharp focus free of astigmatism on the film plane F that is located at a short conjugate distance behind the focusing lens.

It will be understood, of course, that though the invention has been illustrated only schematically in the drawings, in practice, the anamorphoser 20 and the variable astigmatizer 10 may be mounted in a common housing which is readily attached to a conventional camera or projector, and that for such applications the anamorphoser and variable astigmatizer may be manufactured and sold as a separate item. Furthermore, in order to make this invention available for use in anamorphosing systems which are already in use, the variable astigmatizer may be manufactured and sold separately for installation therein.

Though the invention has been described only with reference to its application to photographic devices in the forms of cameras and projectors, it will also be understood that it may be applied to other photographic and optical devices such for example as a projection printer on an animation camera. It will, therefore, be understood that my invention is not limited to the particular embodiment thereof that has been specifically disclosed herein, but that it is applicable to systems employing other types of optical systems, and more particularly that my invention is applicable to all anamorphosing systems which are subject to a change in astigmatism when the focus is varied.

It will also be understood that though I have described what I believe to be the best type and arrangement of variable astigmatizer, other types of variable astigmatizers may be employed. For example, some of the advantages of my invention may be obtained by employing positive and negative cylindrical lenses of unequal power, and even cylindrical lenses that have powers of the same sign, either positive or negative. In any such case, the vertical and horizontal focal lines are brought into coincidence by varying the angles between the cylindrical lenses as the distance of the focusing lens from the film is varied.

It will also be understood that the invention is applicable in at least some forms thereof to anamorphosing systems of fixed focus, and more particularly that in some applications of the invention, a fixed astigmatizer may be employed. For example, in a fixed focus system, astigmatism can be eliminated either by employing only a positive cylindrical lens that has an axis parallel to the active plane of the anamorphoser or by employing only a negative cylindrical lens that has an axis normal to the active plane of the anamorphoser. Furthermore, when the focus of the system is fixed, a combination of positive and negative cylindrical lenses of different powers may be employed to eliminate astigmatism that would otherwise be produced by focusing a lens through an anamorphoser, especially one of the afocal type. Various changes which will now suggest themselves to those skilled in the art may be made in the form, details of construction and arrangement of the elements without departing from the principles of the invention.

The invention claimed is:

1. In an anamorphosing system for taking and projecting pictures, a focusing lens, a variable astigmatizer and an anamorphoser arranged on a common optical axis, said variable astigmatizer comprising a pair of complementary cylindrical lenses mounted with the bisector between their axes normal to said optical axis and at an angle of 45° relative to the active plane of said anamorphoser, means for adjusting the focus of said focusing lens relative to a film plane, and means for varying the angle between the axes of said cylindrical lenses while maintaining said bisector stationary to compensate for variable astigmatism that would otherwise be produced by said anamorphoser and said focusing lens as the position of said focusing lens is adjusted.

2. In an anamorphosing system for taking and projecting pictures, a focusing lens, a variable astigmatizer and an anamorphoser arranged on a common optical axis, said variable astigmatizer comprising a pair of complementary cylindrical lenses mounted with the bisector between their axes normal to said optical axis and at an angle of 45° relative to the active plane of said anamorphosing unit, and means for adjusting the position of said focusing lens along said optical axis relative to a film plane and for simultaneously varying the angle between the axes of said cylindrical lenses to bring a front plane into conjugate focal relationship with said film plane without astigmatism as the focus is varied.

3. An anamorphosing system as defined in claim 2 wherein said astigmatizer is located between said focusing lens and said anamorphoser.

4. In an anamorphosing system, a variable astigmatizer and an anamorphoser arranged on a common optical axis, said variable astigmatizer comprising a pair of complementary cylindrical lenses mounted with the bisector between their axes normal to said optical axis and at an angle of 45° relative to the active plane of said anamorphosing units, and means for varying the angle between the axes of said cylindrical lenses while maintaining said bisector stationary.

References Cited in the file of this patent

UNITED STATES PATENTS

| Number | Name | Date |
|---|---|---|
| 818,553 | Phillips | Apr. 24, 1906 |
| 886,770 | De Zeng | May 5, 1908 |
| 942,393 | Konig | Dec. 7, 1909 |
| 1,292,901 | Smith | Jan. 28, 1919 |
| 1,692,973 | Babcock | Nov. 27, 1928 |
| 1,829,633 | Chretien | Oct. 27, 1931 |
| 1,898,787 | Newcomer | Feb. 21, 1933 |
| 1,931,992 | Newcomer | Oct. 24, 1933 |
| 1,943,172 | Ford | Jan. 9, 1934 |
| 1,945,950 | Newcomer | Feb. 6, 1934 |
| 1,948,636 | Tillyer | Feb. 27, 1934 |
| 2,017,634 | Newcomer | Oct. 15, 1935 |
| 2,048,284 | Newcomer | July 21, 1936 |
| 2,121,567 | Newcomer | June 21, 1938 |
| 2,428,399 | Timoney | Oct. 7, 1947 |
| 2,672,072 | Sachtleben et al. | Mar. 16, 1954 |